Patented July 29, 1941

2,251,156

UNITED STATES PATENT OFFICE 2,251,156

DIESEL FUEL

Edwin M. Nygaard, Woodbury, N. J., assignor to Socony-Vacuum Oil Company, Incorporated, New York, N. Y., a corporation of New York No Drawing. Application October 23, 1940, Serial No. 362,411

6 Claims. (Cl. 44—9)

This invention has to do in a general way with the operation of internal combustion engines and is more particularly concerned with improving the operation of compression ignition or Diesel engines through the use of a fuel containing a characterizing ingredient which acts to improve its ignition quality.

In engines which operate on the Diesel cycle, where the fuel is injected into compressed air in the cylinder and ignites spontaneously, it is important that the delay period between injection and ignition be short so as to promote ease of starting and smoothness of operation. Improperly delayed ignition gives rise to the phenomenon known as knocking.

One object of this invention is to improve the ignition quality of a Diesel fuel by admixing therewith a minor proportion of a novel compound or agent in sufficient proportion to decrease the ignition delay period of the fuel. The invention also contemplates a method for accelerating the ignition of a fuel in a compression ignition engine by admixing with the fuel, prior to its injection into the compressed air of the cylinder, a minor proportion of this characterizing ingredient.

This invention is predicated upon the discovery that a specific class of organic nitrogen compounds, the aromatic diazo thioethers, possesses the property of decreasing the ignition delay period of Diesel fuels when admixed therewith in minor proportions.

The term "aromatic diazo thioethers" as used herein applies to compounds having the general formula R—N=N—S—R', wherein R represents an aromatic radical or a substituted aromatic radical and R' is selected from the group consisting of hydrogen, alkyl, aryl, aralkyl, and alkaryl. These compounds may be prepared by various procedures described in the literature—for example, by the reaction between an aromatic diazonium chloride with hydrogen sulfide, a mercaptan, or an aromatic thiol compound. (Ber. 17, 2078 (1884), Otto Stadler; and Ber. 28, 3237 (1885), Hantzsch and Freese). This reaction may be formulated with an aryl diazonium chloride as follows:

R—N=N—Cl + HS.R' → R—N=N—S.R' + HCl in which R and R' are as defined above.

Typical examples of the aromatic diazo thioethers contemplated herein are listed below with their structural formulae.

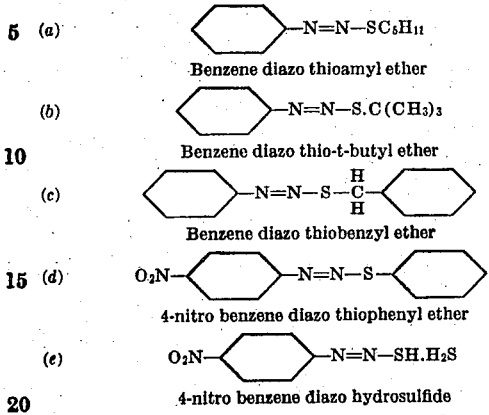

In certain instances, as, for example, with compounds (d) and (e), it is preferable to employ the paranitro-substituted derivative, such compounds being of greater stability than the unsubstituted compounds.

Further details in procedures which may be followed in synthesizing compounds of the type contemplated herein may be obtained from the following illustrative examples.

EXAMPLE ONE

*Preparation of benzene diazo thioamyl ether*

Approximately 1.3 parts of aniline were added to a solution of 2.9 parts of concentrated hydrochloric acid in 12.5 parts of water. After the above solution was cooled to from 0° to 5° C., a solution of 1.0 part of sodium nitrite in 6.3 parts of water was slowly added thereto. To the solution thus obtained was added 1.4 parts of amyl mercaptan, after which the reaction mixture was stirred for some time and then contacted with the proper amount of fuel oil to extract the reaction product (benzene diazo thioamyl ether) from the mixture.

EXAMPLE TWO

*Preparation of 4-nitro benzene diazo thiophenyl ether*

Approximately 1.9 parts of p-nitro aniline were added to a solution of 2.9 parts of concentrated hydrochloric acid in 11.7 parts of water. The above solution was cooled to from 0 to 5° C., and to it was slowly added a solution of 1.0 part of sodium nitrite dissolved in 7.0 parts of water. This mixture may be identified as solution A.

Approximately 1.5 parts of thiophenol were dissolved in a solution of 1.7 parts of sodium hydroxide in 28.0 parts of water. This mixture may be identified as solution B.

Solution B was cooled to approximately 0° C., and to the solution was added the cold solution A.

The precipitated product was partially dried and purified by recrystallization from petroleum ether.

The above-described compounds and others were dissolved in a straight-run number 2 fuel oil and the improvement in ignition quality of the blends ascertained by determination of their cetane numbers. The cetane numbers were determined by the proposed method of the A. S. T. M. (A. S. T. M. Proc. 38, I 392 (1938)). The fuel oil used had the following characteristics.

Gravity, ° A. P. I._____ 39.8
Flash point (Pensky-Martens °F)_____ 172
Aniline point, °F_____ 160.5

A. S. T. M. distillation:

Initial °F_____ 386
10%_____ 435
90%_____ 572
End point_____ 614

Diesel index_____ 63.9
Cetane number_____ 56.5

The cetane number determinations on the fuel blends are listed in the table below.

*Table I*

| Substance blended with 56.5 cetane number fuel | Percent by weight added | Cetane number of blend | Increase in cetane number |
|---|---|---|---|
| Benzene diazo thioamyl ether | 1.0 | 61.0 | 4.5 |
| Benzene diazo thio-t-butyl ether | 1.0 | 61.5 | 5.0 |
| Benzene diazo thiobenzyl ether | 1.0 | 59.0 | 2.5 |
| 4-nitro benzene diazo thiophenyl ether | 0.5 | 62.5 | 6.0 |
| 4-nitro benzene diazo hydrosulfide | 0.5 | 58.0 | 1.5 |

It will be seen from the foregoing table that the aromatic diazo thioethers contemplated herein are effective to improve the ignition quality of Diesel fuels when added thereto in minor proportions. The amount of compound used may be varied, depending upon the base fuel stock, etc., but in general it appears that amounts ranging from about 0.1 per cent to 5.0 per cent will effect the desired improvement.

It is to be understood that the term Diesel fuel as used herein has reference to any hydrocarbon fuel adapted for use in an engine operating according to the Diesel cycle; also that the invention is not limited to the specific compounds or examples of procedures given herein but includes within its scope such variations or modifications as fairly come within the spirit of the appended claims.

I claim:

1. An improved Diesel fuel having in admixture therewith a minor proportion of an aromatic diazo thioether in sufficient amount to decrease the ignition delay period of the fuel.

2. An improved Diesel fuel having in admixture therewith a minor proportion of a benzene diazo thioether in sufficient amount to decrease the ignition delay period of the fuel.

3. An improved Diesel fuel having in admixture therewith a minor proportion of a 4-nitro benzene diazo thioether in sufficient amount to decrease the ignition delay period of the fuel.

4. An improved Diesel fuel having in admixture therewith a minor proportion of a compound having the general formula R—N=N—S—R', wherein R represents a radical selected from the group consisting of aryl radicals and substituted aryl radicals and R' is selected from the group consisting of hydrogen, alkyl, aryl, aralkyl and alkaryl radicals, the said compound being present in an amount sufficient to decrease the ignition delay period of the fuel.

5. An improved Diesel fuel having in admixture therewith a minor proportion of benzene diazo thioamyl ether in sufficient amount to decrease the ignition delay period of the fuel.

6. An improved Diesel fuel having in admixture therewith a minor proportion of benzene diazo thio-t-butyl ether in sufficient amount to decrease the ignition delay period of the fuel.

EDWIN M. NYGAARD.